United States Patent [19]
Ohgami et al.

[11] Patent Number: 5,459,764
[45] Date of Patent: Oct. 17, 1995

[54] CLOCK SYNCHRONIZATION SYSTEM

[75] Inventors: Naoto Ohgami, Tokyo; Naoki Kuwajima, Saitama, both of Japan

[73] Assignee: NEC Corporation, Tokyo, Japan

[21] Appl. No.: 326,831

[22] Filed: Oct. 21, 1994

[30] Foreign Application Priority Data

Oct. 22, 1993 [JP] Japan .................................. 5-263967

[51] Int. Cl.$^6$ ................................................ H04L 7/02
[52] U.S. Cl. ........................... 375/354; 327/141; 326/93
[58] Field of Search .................................. 375/354, 356, 375/362, 364; 327/107, 141; 326/93; 370/100.1

[56] References Cited

U.S. PATENT DOCUMENTS 4,847,867 7/1989 Masu et al. ............................. 375/354
4,964,141 10/1990 Matsushima et al. ................... 375/354

FOREIGN PATENT DOCUMENTS 62-298024 12/1987 Japan .

*Primary Examiner*—Young Tse
*Attorney, Agent, or Firm*—Foley & Lardner

[57] ABSTRACT

A clock synchronization system is constituted by first and second clock generating sections. The first and second clock generating units are alternately set in current and spare use modes. The apparatus clock from one clock generating section in the current use mode is supplied to an external circuit. In each clock generating section, a state signal generating section receives a first state signal representing one of the modes, and outputs a second state signal representing a set mode opposite to the mode represented by the first state signal to the other clock generating section. A clock generating section generates a clock synchronized with the network sync signal. A frequency-dividing circuit outputs an apparatus clock by frequency-dividing the clock in synchronism with the network sync signal when the first state signal represents the spare unit mode, and outputs an apparatus clock by frequency-dividing the clock in synchronism with a sync pulse from the clock generating section when the first state signal represents the current use mode. A clock control section outputs an apparatus clock from the frequency-dividing circuit as a supply clock only when the second state signal represents the current use mode. A sync pulse generating circuit generates a sync pulse which is advances by a predetermined time.

4 Claims, 5 Drawing Sheets

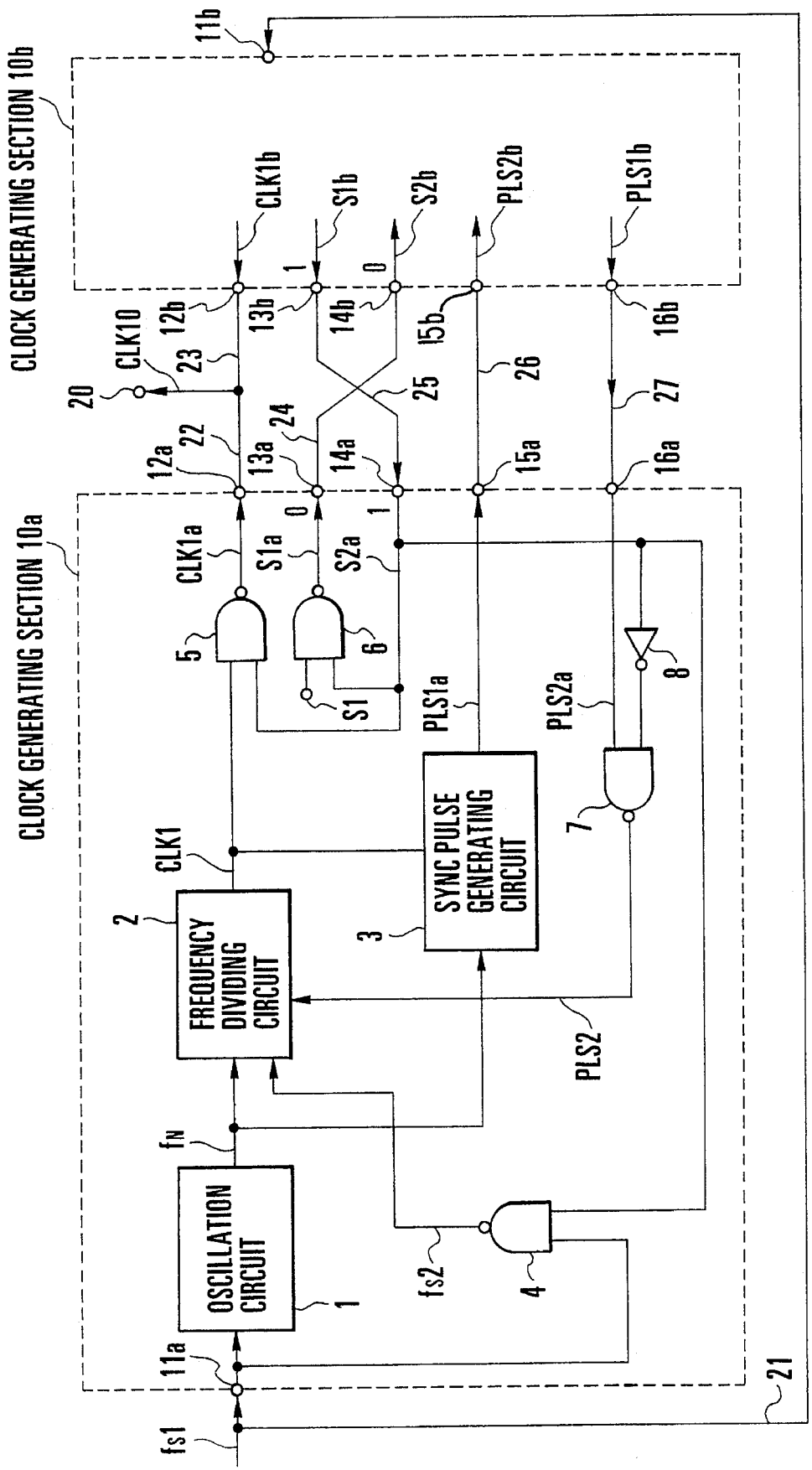
F I G. 1

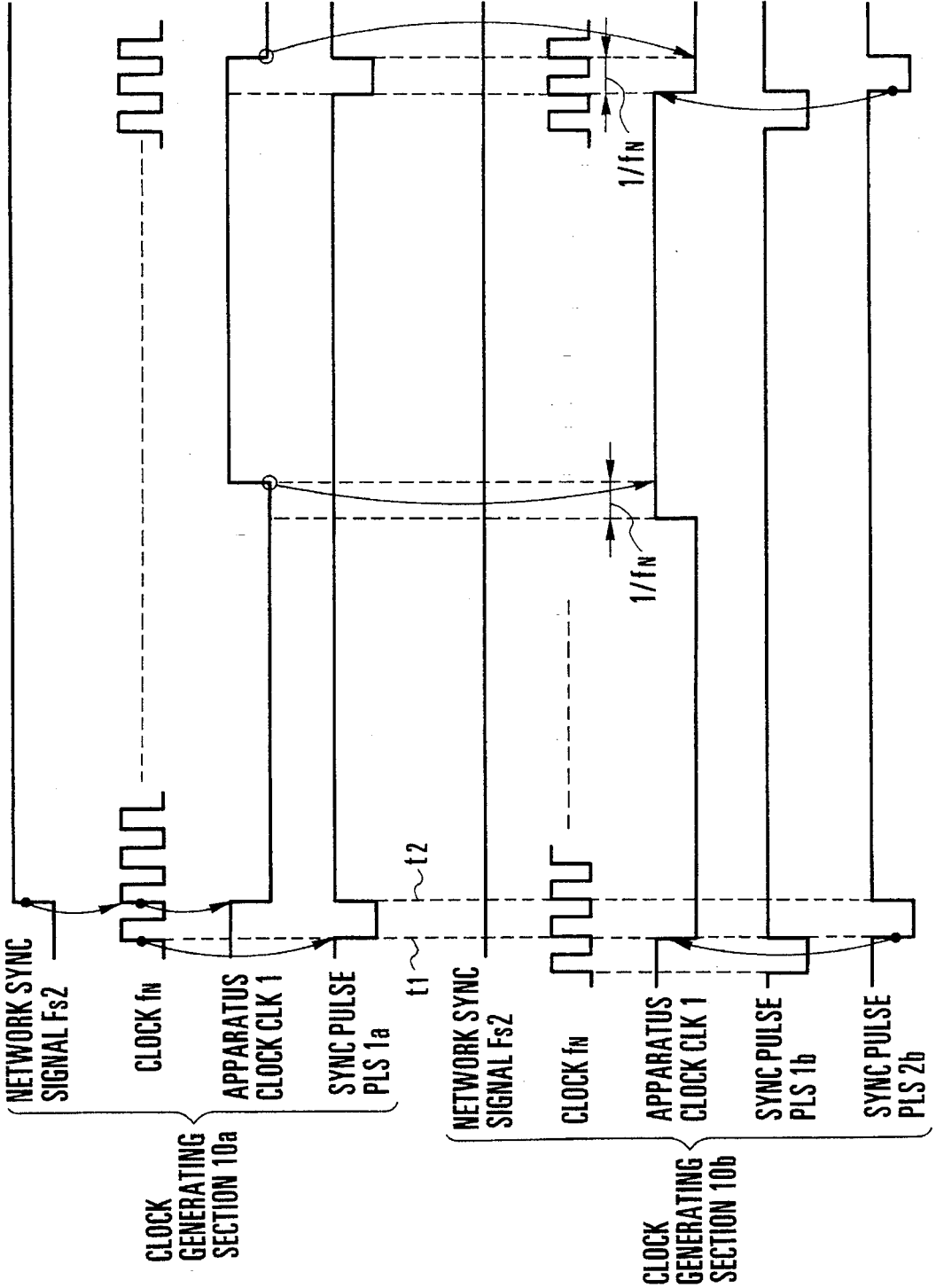

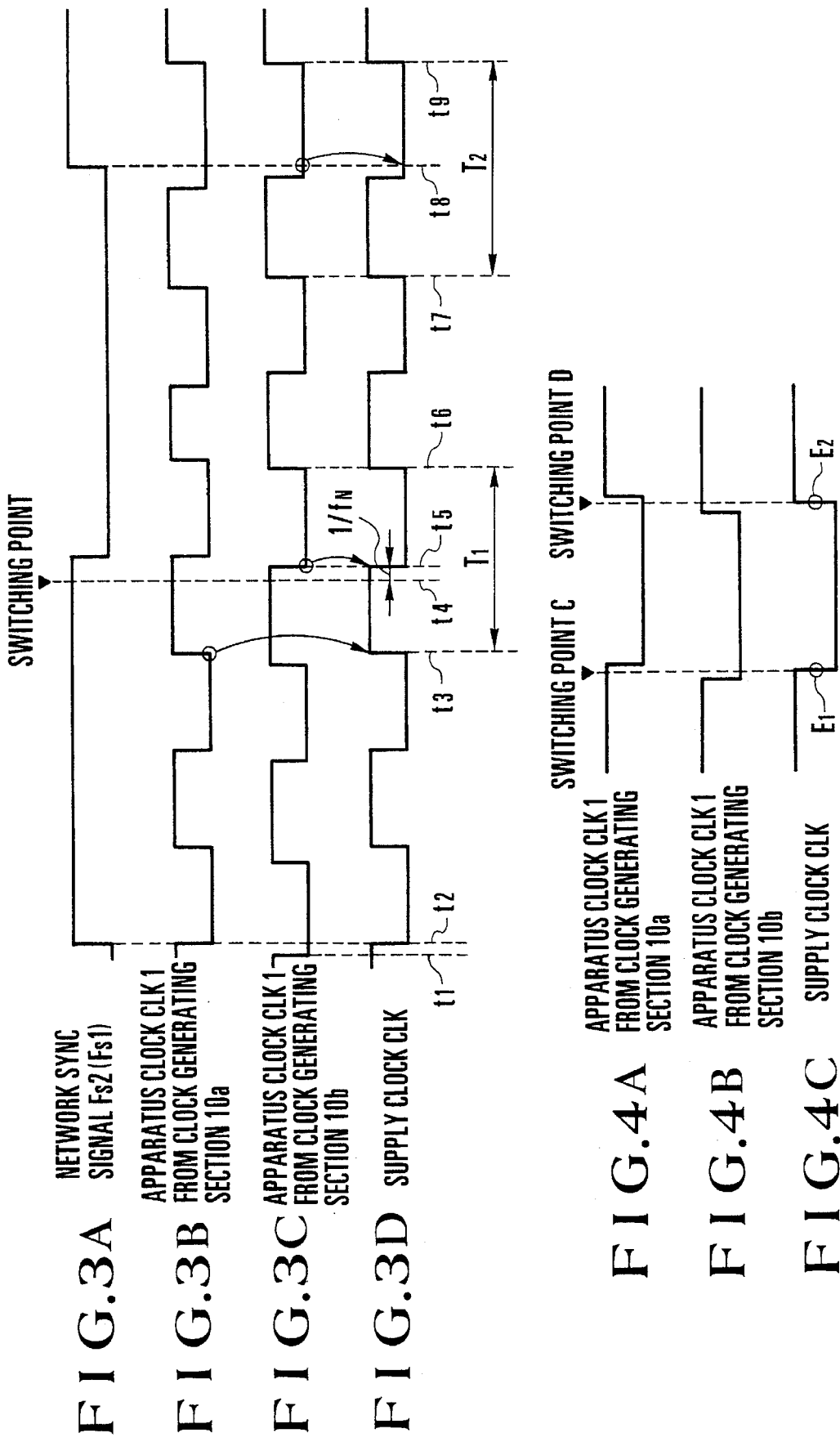

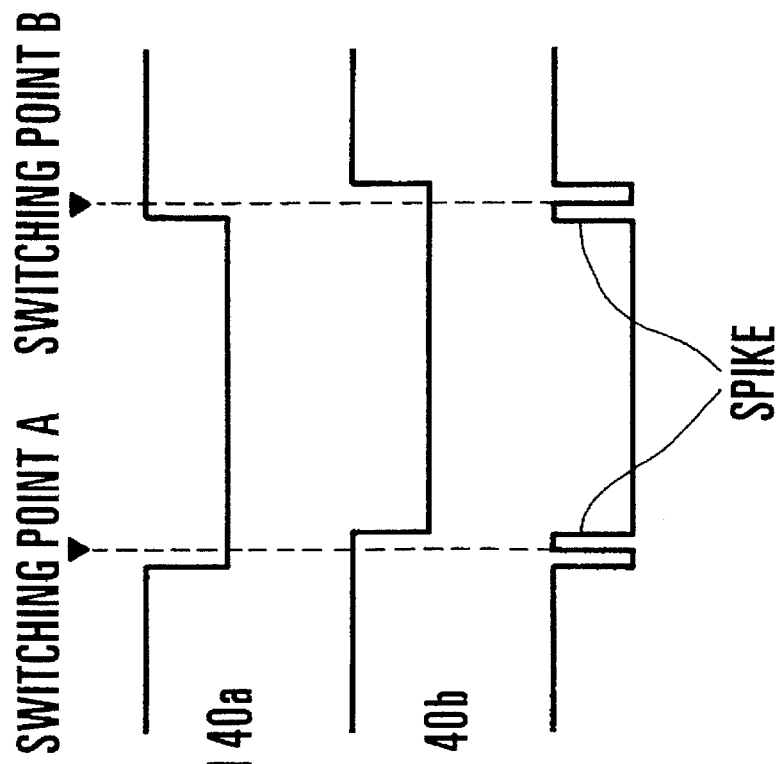

CLOCK SYNCHRONIZATION SYSTEM

BACKGROUND OF THE INVENTION

The present invention relates to a clock synchronization system having a duplex arrangement constituted by current and spare use modes. The system is suitable for generating a clock for a base station in a mobile radio communication apparatus, and, more particularly to, a clock synchronization system in which synchronization of a supply clock is improved by switching over operation between current and spare clock generating sections.

A conversational clock synchronization system will be described below with reference to FIG. 5 showing the arrangement of the system and FIGS. 6A to 6C showing the timings at which supply clocks are switched over.

Clock generating sections 40a and 40b in FIG. 5 have the same arrangement. A state signal S41b from the clock generating section 40b is supplied to a terminal 14a of the clock generating section 40a via a state signal line 25 connected to a terminal 13b. Similarly, a state signal S41a from the clock generating section 40a is supplied to a terminal 14b of the clock generating section 40b via a state signal line 24 connected to a terminal 13a.

A network sync signal fs1 is supplied to a terminal 11a of the clock generating section 40a and a terminal 11b of the clock generating section 40b via an external reference clock line 21. In addition, apparatus clocks CLK41a and CLK41b from terminals 12a and 12b of the clock generating sections 40a and 40b are supplied to a clock output terminal 20 via clock lines 22 and 23. One of the apparatus clocks is selected to be a supply clock CLK40 to be supplied to an external circuit, as will be described later.

When the clock generating section 40a is in the current use mode, the state signal S41a is set at "0", and the state signal S41b from the clock generating section 40b is set at "1". When the clock generating section 40b is in the current use mode, the state signal S41b is set at "0", and the state signal S41b from the clock generating section 40b is set at "1". Assume that the clock generating section 40a is in the current use mode, and a current/spare use mode setting signal S41 is set at "1". In order to reverse the relationship in current/spare use mode between the clock generating sections 40a and 40b, the logic of the current use mode setting signal S41 is inverted to be set at "0". As a result, a NAND gate 44, in the clock generating section 40a, which has received the state signal S42a, i.e., the state signal S41b of "1" from the clock generating section 40b, and the setting signal S41 of "0", inverts the state signal S41a to "1" indicating that the clock generating section 40a is in the spare use mode. As described above, when the relationship in current/spare use mode is to be reversed, the logic of the current use mode setting signal S41 is inverted.

This clock synchronization system in a case wherein the first clock generating section 40a is in the current use mode will be described below.

Upon reception of the network sync signal fs1 via the reference clock line 21, an oscillation circuit 41 of the clock generating section 40a generates a clock $f_M$ synchronized with the network sync signal fs1. This clock $f_M$ and the network sync signal fs1 are supplied to a frequency-dividing circuit 42. The frequency-dividing circuit 42 is reset at the leading edge of the network sync signal fs1 to frequency-divide the clock $f_M$ so as to generate an apparatus clock CLK41. The apparatus clock CLK41 and the state signal S42a from the clock generating section 40b are input to a NAND gate 43. Since the clock generating section 40a is in the current use mode, the state signal S42a is at "1", and the NAND gate 43 is enabled. Therefore, the apparatus clock CLK41 passes through the NAND gate 43 to become an apparatus clock CLK41a. The apparatus clock CLK41a is supplied, as the supply clock CLK40, to the clock output terminal 20 via the clock line 22. In this case, the output of the apparatus clock CLK41 generated by the clock generating section 40b is inhibited by the NAND gate 43, and hence the apparatus clock CLK41b is not output from the terminal 12b.

When the clock generating section 40b is in the current use mode, the apparatus clock CLK41b from the clock generating section 40b is supplied, as the supply clock CLK40, to the clock output terminal 20 via the clock line 23.

In a clock generating section for a base station in a mobile radio communication apparatus having current and spare clock generating sections, in order to prevent a phase shift in the waveform of a supply clock when the current and spare clock generating sections are switched over, an apparatus clock generated by the spare clock generating section must always be made to coincide with an apparatus clock generated by the current clock generating section.

The conventional clock synchronization system described above, however, does not have a function of keeping the relationship in clock phase between the apparatus clocks CLK41a and CLK41b from the clock generating sections 40a and 40b constant. For this reason, it is highly possible that spike waveforms appear before and after (near switching over points A and B) switching over of the supply clock CLK40 especially at clock change points, as shown in FIG. 6C, in switching over between the current and spare clock generating sections, i.e., switching over of the apparatus clock CLK41a (in FIG. 6A) from the clock generating section 40a and the apparatus clock CLK41b (in FIG. 6B) from the clock generating section 40b.

SUMMARY OF THE INVENTION

It is an object of the present invention to provide a clock synchronization system in which no phase shift occurs in a supply clock in a switching over operation from the current use mode to the spare use mode.

It is another object of the present invention to provide a clock synchronization system in which no spikes are produced in a supply clock in a switching over operation from the current use mode to the spare use mode.

It is still another object of the present invention to provide a clock synchronization system which can perform a switching over operation from the current use mode to the spare use mode at an arbitrary timing.

In order to achieve the above objects, according to the present invention, there is provided a clock synchronization system constituted by first and second clock generating units, having the same arrangement, for respectively generating apparatus clocks from a common network sync signal, each of the first and second clock generating units constituting a clock generating unit as a counterpart, the first and second clock generating units being alternately set in current and spare use modes, and the apparatus clock being extracted, as a supply clock to an external circuit, from one of the first and second clock generating units which is set in the current use mode, each of the first and second clock generating units comprising state signal generating means for receiving, from the clock generating unit as a counterpart, a first state signal representing one of the current and spare use modes in which the clock generating unit as the counterpart is set, and outputting a second state signal representing a set mode opposite to the mode represented by the first state signal to the clock generating unit as the counterpart, clock generating means for generating a clock synchronized with the network sync signal, frequency-dividing means for outputting an apparatus clock by frequency-dividing the clock from the clock generating means in synchronism with the network sync signal when the first state signal represents the spare use mode, and outputting an apparatus clock by frequency-dividing the clock from the clock generating section as a counterpart in synchronism with a sync pulse from the clock generating section when the first state signal represents the current use mode, clock control means for outputting an apparatus clock from the frequency-dividing means as a supply clock only when the second state signal represents the current use mode, and sync pulse generating means for generating a sync pulse which is advances by a predetermined time on the basis of the apparatus clock from the frequency-dividing means.

BRIEF DESCRIPTION OF THE DRAWINGS

FIG. 1 is a block diagram showing the arrangement of a clock synchronization system according to an embodiment of the present invention;

FIGS. 2A to 2I are timing charts showing the operation of the system shown in FIG. 1;

FIGS. 3A to 3D are timing charts showing the waveforms of output clocks in a switching over operation from the current use mode to the spare use mode in the system shown in FIG. 1;

FIGS. 4A to 4C are timing charts precisely showing points at which the current and spare use modes are switched over in the system shown in FIG. 1;

FIGS. 6A to 6C are timing charts showing a supply clock switching over operation in the clock synchronization system shown in FIG. 5.

DESCRIPTION OF THE PREFERRED EMBODIMENT

Figure 5:
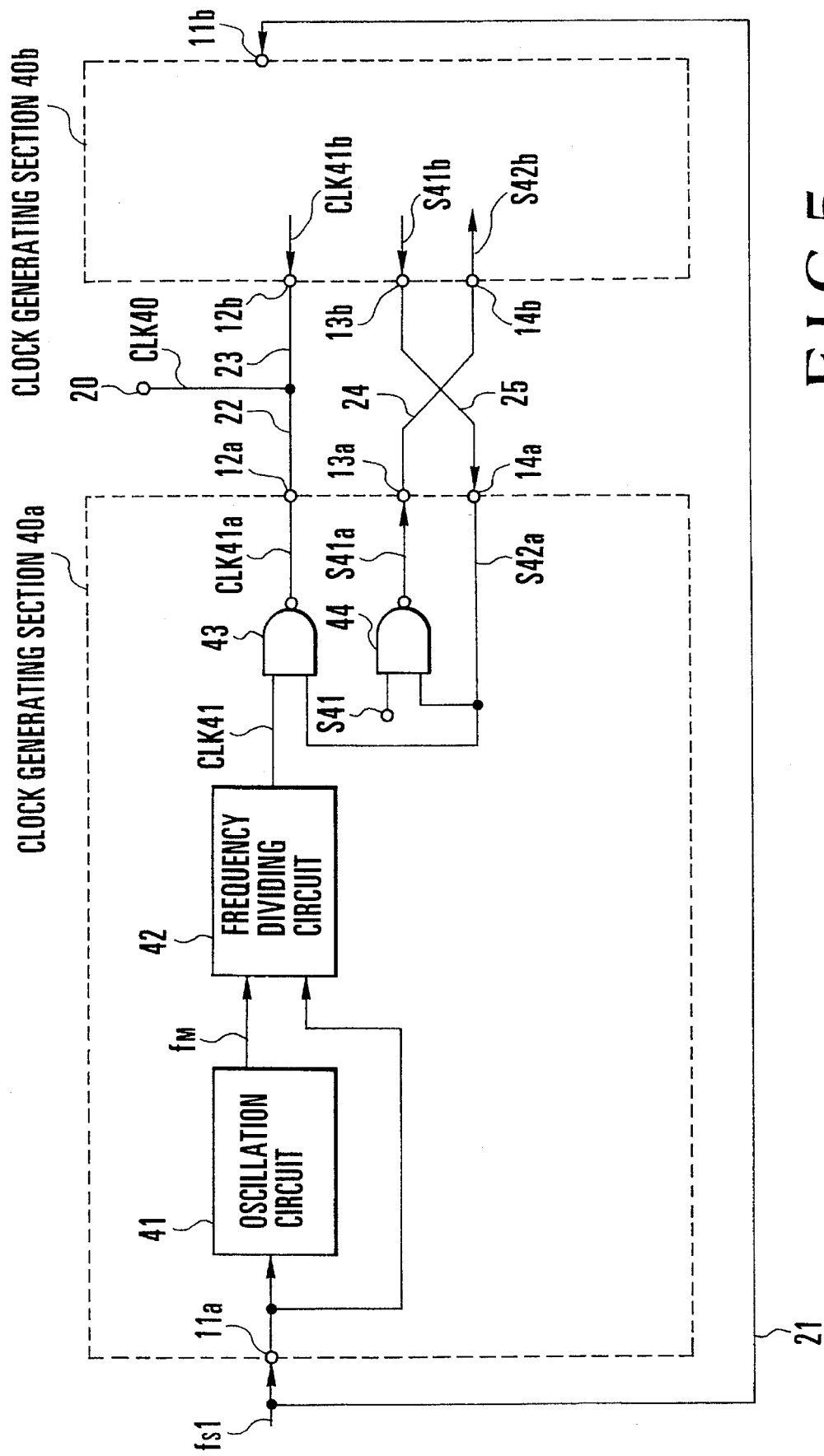
FIG. 5 is a block diagram showing the arrangement of a conventional clock synchronization system.

The present invention will be described next with reference to the accompanying drawings.

FIG. 1 shows the arrangement of a clock synchronization system according to an embodiment of the present invention.

This clock synchronization system includes clock generating sections 10a and 10b having the same arrangement. A state signal S1b from the clock generating section 10b is supplied to a terminal 14a of the clock generating section 10a via a state signal line 25 connected to a terminal 13b. Similarly, a state signal S1a from the clock generating section 10a is supplied to a terminal 14b of the clock generating section 10b via a state signal line 24 connected to a terminal 13a.

A network sync signal fs1 is supplied to terminals 11a and 11b of the clock generating sections 10a and 10b , respectively, via an external reference clock line 21. Apparatus clocks CLK1a and CLK1b from terminals 12a and 12b of the clock generating sections 10a and 10b are supplied to a clock output terminal 20 via clock lines 22 and 23 connected to each other. One of the apparatus clocks is selected to become a supply clock CLK10 to be supplied to an external circuit, as will be described later.

When the clock generating section 10a is in the current use mode, the state signal S1a from the clock generating section 10a is set at "0", and the state signal S1b from the clock generating section 10b is set at "1". When the clock generating section 10b is in the current use mode, the state signal S1a from the clock generating section 10a is set at "1", and the state signal S1b from the clock generating section 10b is set at "0". Assume that the clock generating section 10a is in the current use mode, and a current/spare use mode setting signal S1 is at "1". In this case, in order to reverse the relationship in current/spare use mode between the clock generating sections 10a and 10b, the logic of the current use mode setting signal S1 is inverted to "0". As a result, a NAND gate 6 which has received the current/spare use mode setting signal S1b of "1" from the clock generating section 10b, i.e., a state signal S2a in the clock generating section 10a and the setting signal S1 of "0", inverts the state signal S1 to "1" indicating that the clock generating section 10a is in the spare use mode. As described above, based on the relationship in current/spare use mode, the logic of the current use mode setting signal S1 is inverted.

In contrast to this, when the clock generating section 10b is in the current use mode, the apparatus clock CLK1b from the clock generating section 10b is supplied, as the supply clock CLK10, to the clock output terminal 20 via the clock line 23.

The above-described operation of this embodiment is the same as that of the conventional clock synchronization system described with reference to FIGS. 6A to 6C.

The characteristic features of the clock synchronization system of the present invention will be mainly described below in a case wherein the first clock generating section 10a is in the current use mode.

Upon reception of the network sync signal fs1 via the reference clock line 21, an oscillation circuit 1 of the clock generating section 10a generates a clock $f_N$ synchronized with the network sync signal fs1. A NAND gate 4 receives the network sync signal fs1 and the state signal S2a of "1" generated by the clock generating section 10b, and generates a network sync signal fs2 as an inverted signal of the network sync signal fs1. The clock $f_N$ and the network sync signal fs2 are supplied to a frequency-dividing circuit 2 constituted by a counter. Note that a sync pulse PLS2 is also supplied from a NAND gate 7 to the frequency-dividing circuit 2. The sync pulse PLS2 is a signal which originates from a sync pulse generating circuit 3 of the clock generating section 10b. Since the state signal S2a of "1" generated by the clock generating section 10b is supplied to one input terminal of the NAND gate 7 via an inverter 8, the NAND gate 7 is disabled while the clock generating section 10a is in the current use mode. Therefore, the sync pulse PLS2 is not input to the frequency-dividing circuit 2, and the frequency-dividing circuit 2 of the clock generating section in the current use mode generates an apparatus clock CLK1 synchronized with the network sync signal fs2 regardless of a sync pulse PLS2a originating from the sync pulse generating circuit 3 of the clock generating section in the spare use mode. That is, the frequency-dividing circuit 2 is reset at the trailing edge of the network sync signal fs2 to frequency-divide the clock $f_N$ so as to generate the apparatus clock CLK1.

The apparatus clock CLK1 and the state signal S2a generated by the clock generating section 10b are input to a NAND gate 5, as in the case with the clock generating section 40a in FIG. 5. Since the clock generating section 10a is in the current use mode, the state signal S2a is at "1", and the NAND gate 5 is enabled. Therefore, the apparatus clock CLK1 passes through the NAND gate 5 to become the apparatus clock CLK1a. The apparatus clock CLK1a is supplied, as the supply clock CLK10, to the clock output terminal 20 via the clock line 22. In this case, the output of the apparatus clock CLK1b generated by the clock generating section 10b is inhibited by the NAND gate 5 of the clock generating section 10b. Therefore, the apparatus clock CLK1b is not output from the terminal 12b.

The sync pulse generating circuit 3 of the clock generating section 10a synchronously responds to the apparatus clock CLK1 and the clock $f_N$ to output a sync pulse PLS1a corresponding to one clock portion of the clock $f_N$ immediately before the trailing edge of the apparatus clock CLK1. The sync pulse PLS1a is supplied to a terminal 15b of the clock generating section 10b via a terminal 15a and a sync pulse output line 26.

The operation of this embodiment in the clock generating section 10b will be described below. In the clock generating section 10b, the sync pulse PLS1a is supplied, as a sync pulse PLS2b, to the other input terminal of a NAND gate 7. Since the state signal S1a (a state signal S2b in the clock generating section 10b) of "0" is supplied from the clock generating section 10a to one input terminal of the NAND gate 7, the NAND gate 7 is enabled. As a result, a sync pulse PLS2 is supplied to a frequency-dividing circuit 2 while the clock generating section 10b is in the spare use mode. The frequency-dividing circuit 2 is loaded at the trailing edge of the sync pulse PLS2 to frequency-divide a clock $f_N$ so as to generate an apparatus clock CLK1. In this case, since a NAND gate 4 is disabled, a network sync signal fs2 is not supplied to the frequency-dividing circuit 2. Therefore, the clock generating section 10b generates the apparatus clock CLK1 synchronized with the sync pulse PLS2b (the sync pulse PLS1a generated by the clock generating section 10a) from the clock generating section 10a in the current use mode.

FIGS. 2A to 2I show the operation of this embodiment. The operation of the clock synchronization system of the embodiment will be described below with reference to FIGS. 1 and FIGS. 2A to 2I.

The oscillation circuit 1 of the clock generating section 10a generates the clock $f_N$ (shown in FIG. 2B) corresponding to a fraction of an integer of the network sync signal fs1 in synchronism with the network sync signal fs1 (at the same timing as the network sync signal fs2 shown in FIG. 2A). The frequency-dividing circuit 2 frequency-divides the clock $f_N$ in synchronism with the network sync signal fs2 to generate the apparatus clock CLK1 shown in FIG. 2C. The sync pulse generating circuit 3 generates the sync pulse PLS1a shown in FIG. 2D at a timing t1 advanced with respect to the apparatus clock CLK1 by a time corresponding to the width of one clock of the clock $f_N$. The sync pulse PLS1a is generated by the second input apparatus clock CLK1.

Meanwhile, the clock generating section 10b inputs the sync pulse PLS1a (shown in FIG. 2D) from the clock generating section 10a, i.e., the sync pulse PLS2b shown in FIG. 2I, to the frequency-dividing circuit 2 via the NAND gate 7. The frequency-dividing circuit 2 loads the sync pulse PLS2b at a timing t2 corresponding to the trailing edge of the sync pulse PLS2b, and frequency-divides the clock $f_N$ shown in FIG. 2F, thereby generating the apparatus clock CLK1 shown in FIG. 2G. Therefore, the phase of the apparatus clock CLK1 generated by the clock generating section 10b always advances from that of the apparatus clock CLK1 (shown in FIG. 2C) generated by the clock generating section 10a by a time corresponding to the width of one pulse of the sync pulse PLS2a, i.e., the width of $1/f_n$ period. In the clock generating section 10b, since the NAND gate 4 is disabled, the network sync signal fs2 shown in FIG. 2E is not output, and the sync pulse PLS2b is not generated to advance from the apparatus clock CLK1 by a time corresponding to the width of one clock of the clock $f_N$, unlike the sync pulse PLS1a (shown in FIG. 2D) in the clock generating section 10a.

FIGS. 3A to 3D and FIGS. 4A to 4C show the waveforms of output clocks in switching over between the current and spare clock pulse generating sections. FIGS. 3A to 3D show the waveforms of the output clocks. FIGS. 4A to 4C show the switching over points in detail.

The relationship in phase between the apparatus clock CLK1 (shown in FIG. 3B) generated by the clock generating section 10a and the apparatus clock CLK1 (shown in FIG. 3C) generated by the clock generating section 10b is set such that the apparatus clock CLK1 (shown in FIG. 3C) generated by the clock generating section in the spare use mode always advances from the other apparatus clock CLK1 by a time corresponding to the width of one pulse of the sync pulse PLS1a ($1/f_N$ between the timings t1 and t2). When the current and spare clock generation sections are switched over at an arbitrary timing, the supply clock CLK shown in FIG. 3D exhibits a clock waveform which advances in phase by an amount corresponding to the width of one pulse of the sync pulse PLS1a, i.e., one clock of the clock $f_N$. The clock generating section 10b, which is newly switched over to the current use mode, generates the apparatus clock CLK1 phase-locked to the next network sync signal shown in FIG. 3A immediately after the switching over operation. The clock generating section 10b then outputs the apparatus clock CLK1, as a supply clock CLK, to the clock output terminal 20. Therefore, the phase of the supply clock CLK shown in FIG. 3D is advanced or delayed, i.e., varies, by only one period of the clock $f_N$ ($1/f_n$) at most, during periods T1 and T2 of the network sync signal fs2 (fs1) immediately after the switching over operation. That is, no waveform error occurs.

In this embodiment, even if the current and spare clock generating sections are switched over at a timing corresponding to a changing point (switching over point C or D) (shown in FIG. 4A) of the apparatus clock CLK1 generated by the clock generating section 10a, since the phase of the apparatus clock CLK1 generated by the clock generating section 10b changes to advance the apparatus clock CLK1 generated by the clock generating section 10a in the current use mode, as shown in FIG. 4B, no spikes are produced at trailing and leading edges E1 and E2 of the supply clock CLK, as shown in FIG. 4C. This is the reason why the phase of the apparatus clock CLK1 generated by the clock generating section 10a is not set to coincide with the phase of the apparatus clock CLK1 generated by the clock generating section 10b.

As has been described above, according to the present invention, synchronization is performed while the phase of an apparatus clock generated by the clock generating section in the current use mode is caused to advance from that of an apparatus clock generated by the clock generating section in the spare use mode by a predetermined value. Therefore, even if the current and spare clock generating sections are switched over at a timing near a changing point of the apparatus clock, no spikes are produced in the waveform of a supply clock.

In addition, according to the present invention, for the above-described reason, the supply clock for the clock generating section in the current use mode can be switched over to the supply clock for the clock generating section in the spare use mode at an arbitrary timing.

What is claimed is:

1. A clock synchronization system comprising first and second clock generating units, having a same arrangement for respectively generating apparatus clocks from a common network sync signal, each of said first and second clock generating units constituting a clock generating unit as a counterpart, said first and second clock generating units being alternately set in current and spare use modes, and the apparatus clock being extracted, as a supply clock to an external circuit, from one of said first and second clock generating units which is set in the current use mode, each of said first and second clock generating units comprising:

state signal generating means for receiving, from said clock generating unit as the counterpart, a first state signal representing one of the current and spare use modes in which said clock generating unit as the counterpart is set, and outputting a second state signal representing a set mode opposite to the mode represented by the first state signal to said clock generating unit as the counterpart;

clock generating means for generating a clock synchronized with the network sync signal;

network sync signal control means for receiving the network sync signal and for outputting an opposite-polarity network sync signal only when the first state signal represents the spare use mode;

sync pulse control means for outputting a sync pulse from said clock generating unit as the counterpart only when the first state signal represents the current use mode;

frequency-dividing means for outputting an apparatus clock by frequency-dividing the clock received from said clock generating means in synchronism with the opposite-polarity network sync signal received from said network sync signal control means, and outputting the apparatus clock by frequency-dividing the clock received from said clock generating means in synchronism with the sync pulse received from said sync pulse control means of said clock generating unit as the counterpart;

clock control means for outputting the apparatus clock received from said frequency-dividing means as the supply clock only when the second state signal represents the current use mode; and sync pulse generating means for generating a sync pulse which is advanced by a predetermined time on the basis of the apparatus clock received from said frequency-dividing means, to output the generated sync pulse to said clock generating unit as the counterpart.

2. The clock synchronization system according to claim 1, wherein said sync pulse generating means generates the sync pulse which is advanced by a time corresponding to a width of one period of the clock received from said clock generating means on the basis of the clock received from said clock generating means.

3. The clock synchronization system according to claim 1, wherein said network sync signal control means includes a first NAND circuit for receiving the first state signal and the network sync signal as two inputs, and said sync pulse control means includes a second NAND circuit for receiving an inverted signal of the first state signal and the sync pulse from said clock generating unit as the counterpart as two inputs.

4. The clock synchronization system according to claim 1, wherein said state signal generating means includes a logic inverting means for inverting a logic level of the first state signal to output the inverted signal as the second state signal when a state setting signal for designating switching over to the spare use mode is not input, said logic inverting means outputting an input state setting signal as the second state signal representing the spare use mode only when the first state signal represents the spare use mode.

* * * * *